April 11, 1950 F. H. BARNHART 2,503,609

PHONOGRAPH RECORD DISK

Filed June 6, 1947

INVENTOR.
Frank H. Barnhart

BY Victor J. Evans & Co.

ATTORNEYS

Patented Apr. 11, 1950 2,503,609

UNITED STATES PATENT OFFICE 2,503,609

PHONOGRAPH RECORD DISK

Frank H. Barnhart, Fostoria, Ohio

Application June 6, 1947, Serial No. 753,100

1 Claim. (Cl. 274—42)

This invention relates to record plates or discs for phonographs, radio phonographs or automatic record players which are in use at the present time.

An object of the invention is to provide a record plate or disc having a sunken sound track which will not be damaged when the record is piled with other records or accidentally slid over a table top, counter or other similar surface.

Another object of the invention is to provide a record plate or disc that has surface contacting areas at the outer marginal edge, and at the center of the plate or disc, to prevent the warping thereof when it is placed on the turn table or other types of flat surfaces, and also to provide the necessary friction for driving the plate or disc on the turntable.

With the above and other objects and advantages in view, the invention consists of the novel details of construction, arrangement and combination of parts more fully hereinafter described, claimed and illustrated in the accompanying drawing in which:

Figure 1:
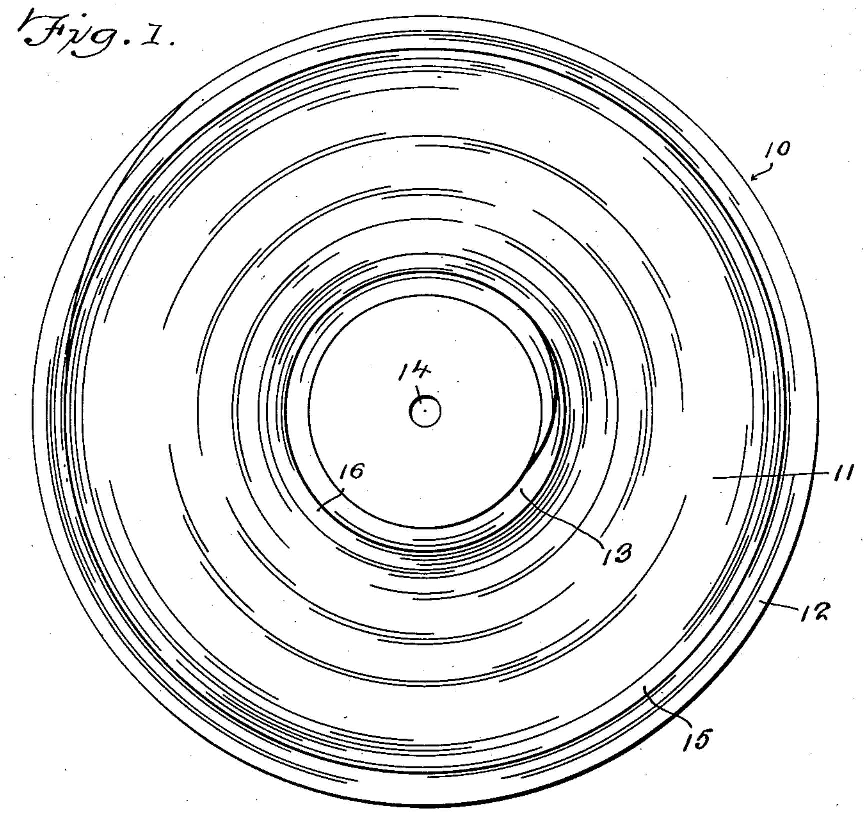
Figure 1 is a plan view of a record plate or disc embodying the invention.
Figure 2:
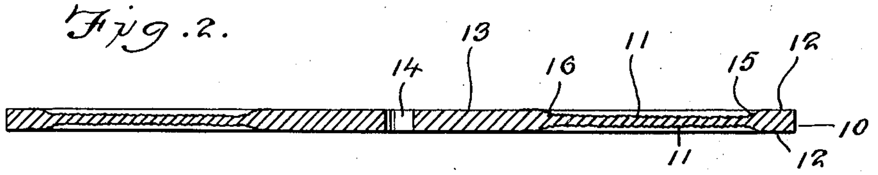
Figure 2 is a cross-sectional view thereof.

Referring more in detail to the drawing, the reference numeral 10 designates a record plate or disc which is made from any material that is used for making articles of this nature.

The invention contemplates forming the record plate or disc of conventional thickness, but insetting the sound track 11 on both sides of the record plate or disc. The insetting of the sound track produces a marginal edge ring or supporting surface 12 on both sides of the record plate or disc, and a central circular supporting surface 13 at the center thereof in which the conventional opening 14 is located.

The record plate or disc would have the usual starting groove located in the surface 12 and the eccentric ending groove in the surface 13.

The inset would taper gradually downward as shown at 15, so the fall of the tone arm would not be abrupt, and a gradual upward taper 16 at the surface 13, at the rise of the inset. This gradual taper would prevent damage to the tone arm, the needle carried by the tone arm, as well as the record plate or disc itself.

The supporting surface prevents damage to the sound track and prevents warping of the record when lying or resting on a flat surface. A record plate or disc of this type is invaluable for the protection of the sound track when used in a record player or changer, since it will prevent damage to the sound track while the records are in contact with each other. If the records are stacked flat or on edge in contact with each other, sliding of the records against each other will not damage the sound track.

Figure 3:
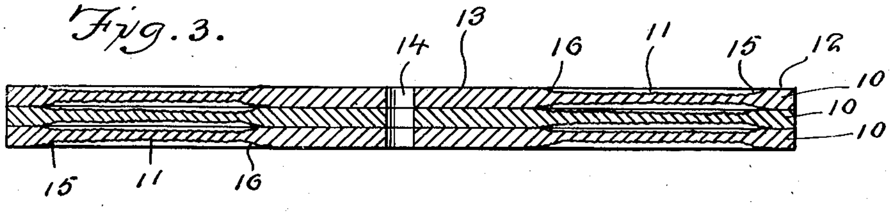
Figure 3 is a cross-sectional view of a plurality of record plates or discs showing the manner of stacking for protection of the sound track thereon.

There should also be somewhat of a saving of material in making a record of this type, as can be seen from Figure 3 which shows the records piled on top of one another to more clearly show the area that permits this saving of material.

From the foregoing description, it is believed that the advantages and construction of the invention will be apparent to those skilled in the art, and it is to be understood that minor details of the construction and formation of the record may be changed, providing such changes fall within the spirit of the invention and the scope of the appended claim.

Having thus described the invention, what is claimed as new and desired to be secured by Letters Patent is:

A record plate or disc of the character described having a raised central portion, a concentric sunken portion and a raised concentric marginal edge portion on each side thereof, the outer peripheral edge of the raised central portion being tapered to cause a gradual rise from the sunken portion to the raised central portion and the inner peripheral edge of the marginal portion being tapered to cause a gradual decline into the sunken portion, a grooved sound track in said sunken portion, the starting groove of the grooved sound track being located in the marginal edge portion and leading into the grooved sound track in the sunken portion, and the eccentric ending groove of the sound track being located in the raised central portion and the grooved sound track in the central portion being connected by a groove in the tapered edge of the raised portion to the eccentric ending groove, and the formation of the surface of said disc adapted to prevent the disc from warping when placed on a flat surface.

FRANK H. BARNHART.

REFERENCES CITED

The following references are of record in the file of this patent:

UNITED STATES PATENTS

| Number | Name | Date |
|---|---|---|
| 946,563 | Rhodes | Jan. 18, 1910 |
| 1,455,886 | Rose | May 22, 1923 |
| 1,665,759 | Vasselli | Apr. 10, 1928 |
| 1,737,619 | Smith | Dec. 3, 1929 |
| 2,050,366 | Moss | Aug. 11, 1936 |
| 2,287,240 | Haltenhof | June 23, 1942 |

FOREIGN PATENTS

| Number | Country | Date |
|---|---|---|
| 8,121 | Great Britain | Apr. 5, 1909 |
| 124,508 | Australia | Sept. 25, 1931 |
| 443,259 | Germany | Apr. 19, 1927 |